Jan. 28, 1964 M. A. BOWERS 3,119,251
MULTIPLE COLUMN GAS CHROMATOGRAPHY VALVE
Filed May 20, 1960 4 Sheets-Sheet 1

INVENTOR.
Melvin A. Bowers

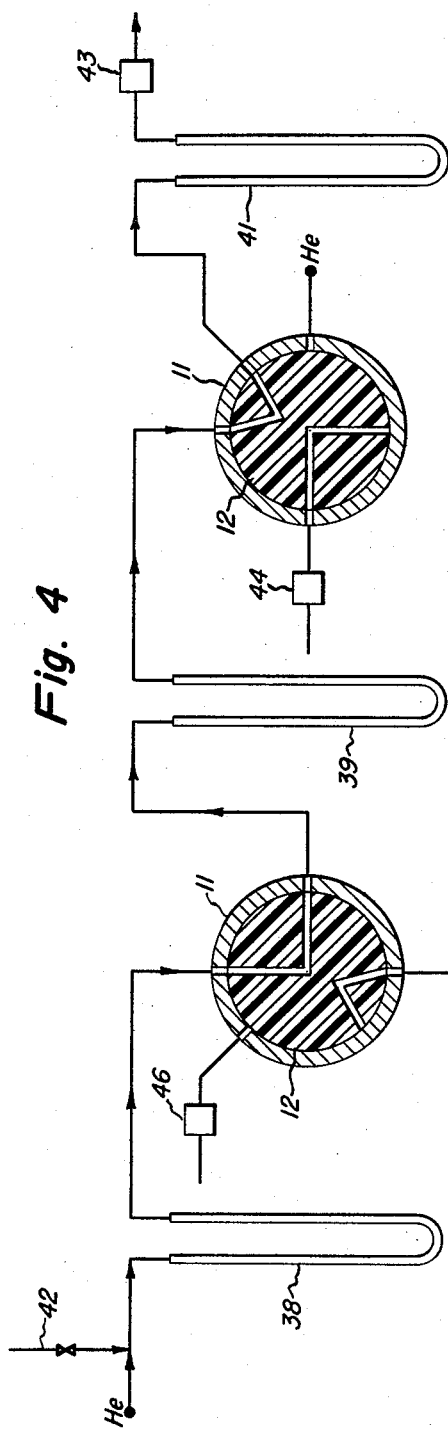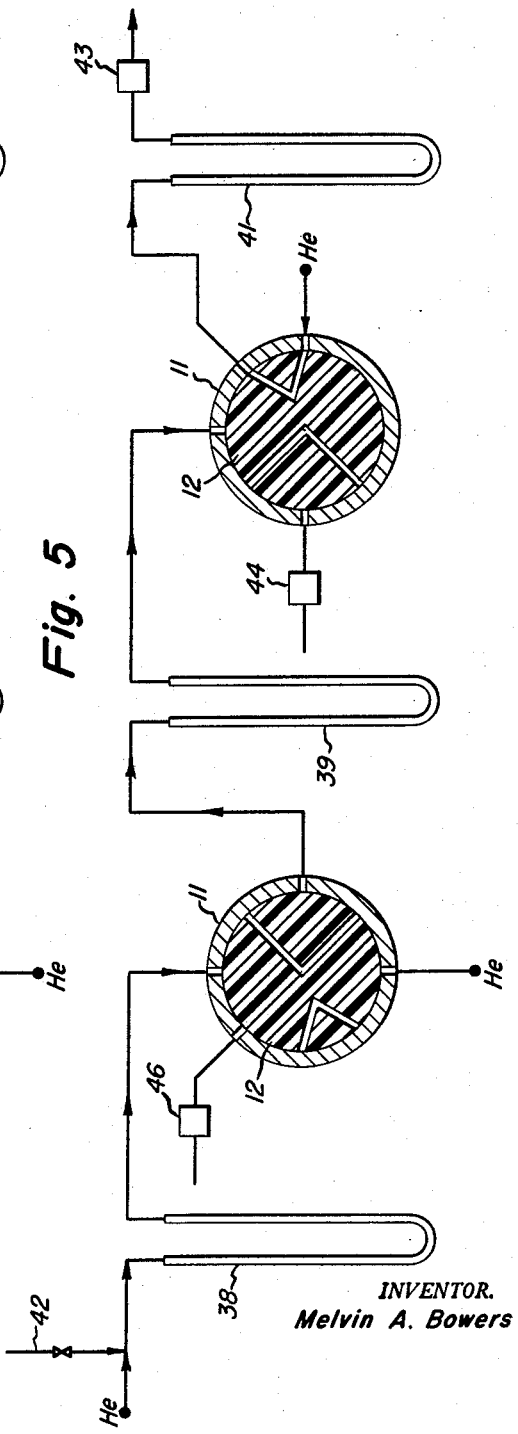

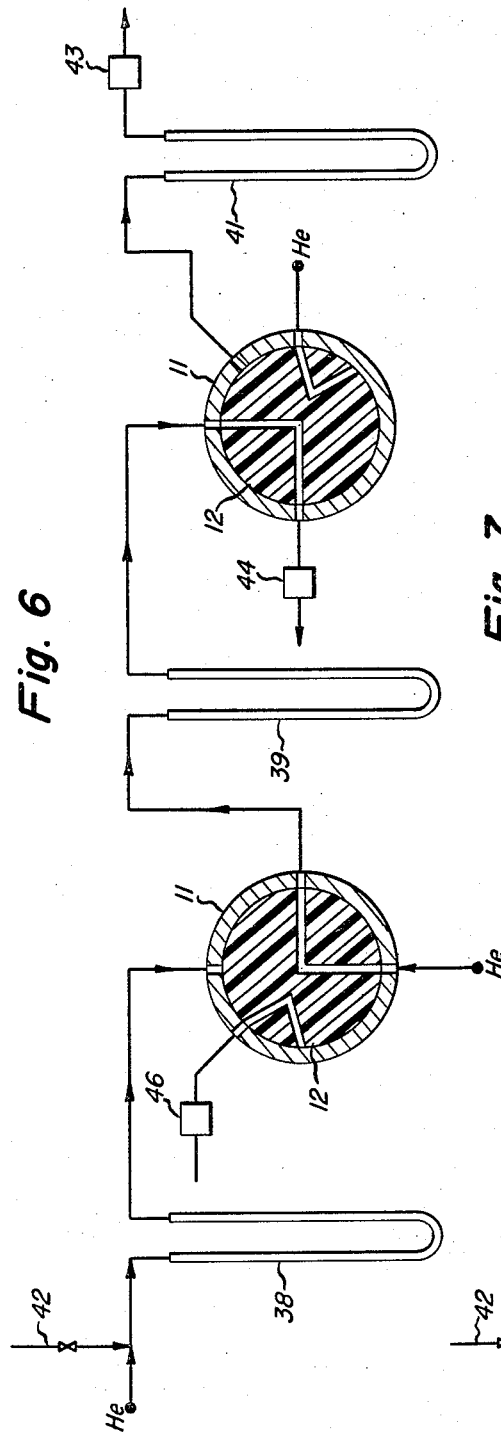
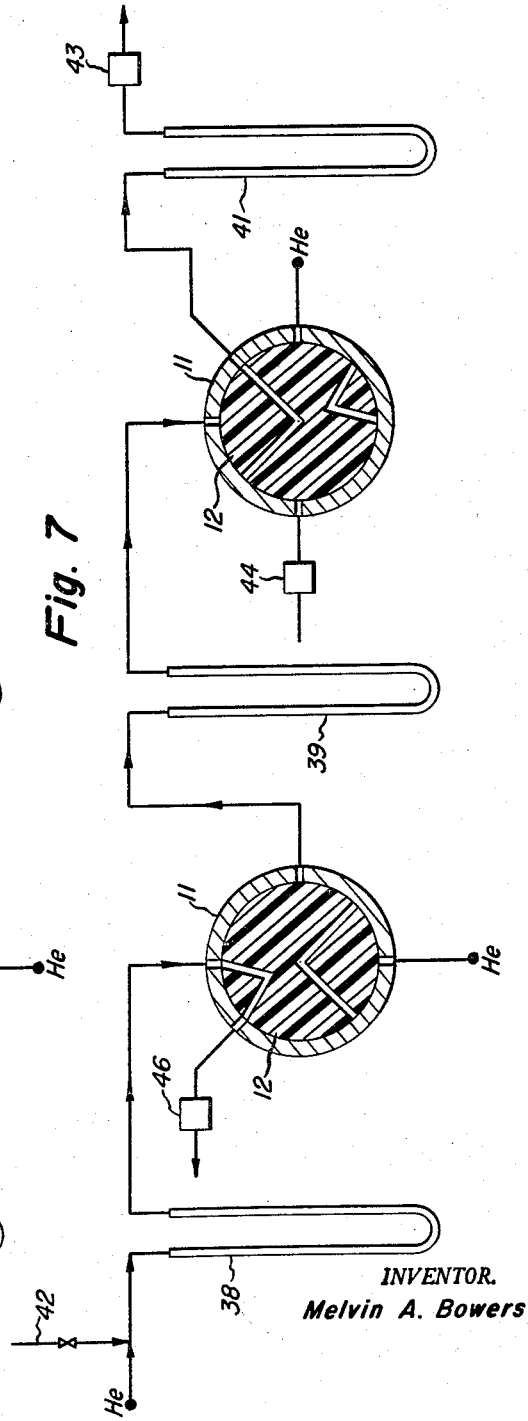

Jan. 28, 1964  M. A. BOWERS  3,119,251
MULTIPLE COLUMN GAS CHROMATOGRAPHY VALVE
Filed May 20, 1960  4 Sheets-Sheet 4
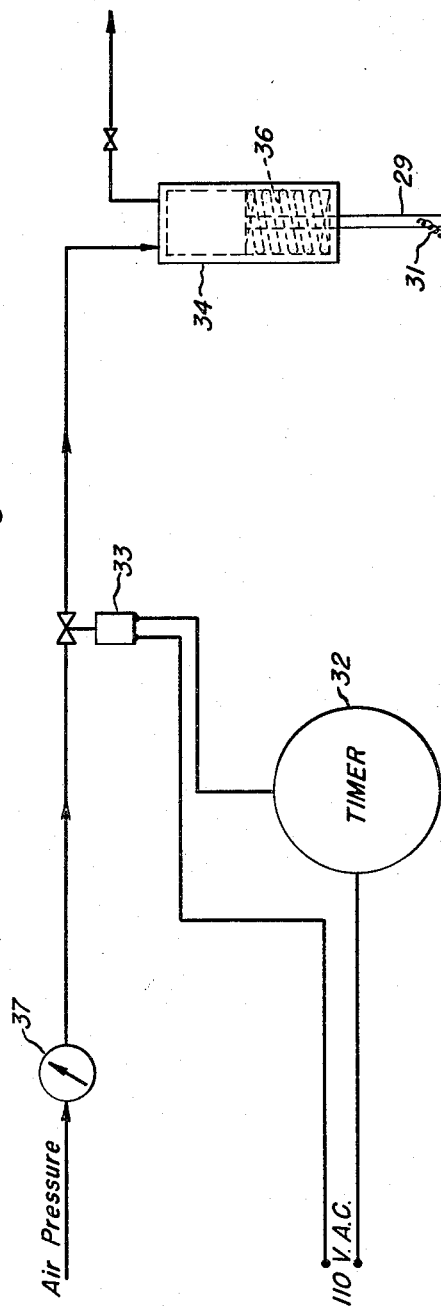
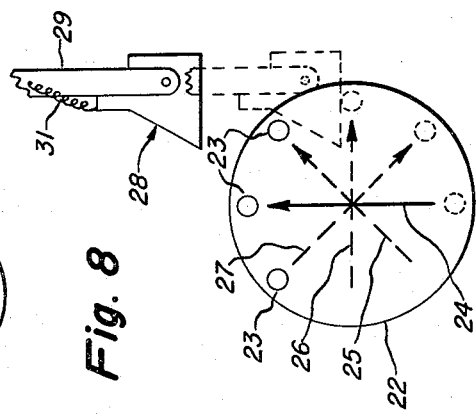
INVENTOR.
Melvin A. Bowers

United States Patent Office 3,119,251
Patented Jan. 28, 1964

3,119,251
MULTIPLE COLUMN GAS CHROMATOGRAPHY VALVE
Melvin A. Bowers, Neodesha, Kans., assignor to Standard Oil Company, Chicago, Ill., a corporation of Indiana
Filed May 20, 1960, Ser. No. 30,604
1 Claim. (Cl. 73—23)

This invention relates to a method and means of gas analysis by gas chromatography. More particularly it relates to means of directing the gas flow in a multiple column gas chromatographic system.

In many applications of gas chromatography it is necessary to analyze a sample containing components having a wide range of boiling points and perhaps containing several components which cannot effectively be separated by a single chromatographic column packing material. In these instances it may be necessary to employ multiple chromatographic columns containing different adsorbents and/or to use a heated column.

When operating a multiple column system it is generally desirable to at times trap a group of components, not effectively separated by one column, in another column containing a packing which satisfactorily separates the components, and then later effectuate the separation of the components previously "parked" in the second column. At times it is also desirable to "back-flush" one or more of the columns in the system to aid in correcting for the changes in flow characteristics resulting from use over a period of time. This back-flushing is performed by reversing the flow of carrier gas through the column. The carrier gas and carrier gas-sample gas streams may travel through one column at a given time, or serially through several columns and ultimately to a detector which signals variations in composition of the gas stream flowing through it.

In the past it has been necessary to connect the various pieces of apparatus in a multiple column gas chromatography system by a manifold and numerous valves in order to be able to direct the flow of gas streams through the columns, either singly or in various combinations. This has required the manual manipulation of a large number of valves at critical times during the analysis to correspond with the emergence of particular components from a column. Consequently, this procedure requires the close attention of the operator in order to mave the valve changes as required. Corresponding increases in the likelihood of error and the costs of the analysis result.

An object of this invention is a simple, but accurate, method and means of conducting a gas analysis by multiple column gas chromatography methods which permits gas analyses on a routine basis to be made with a minimum of attention by the operator. Another object of this invention is a valve mechanism which automatically directs the flow of gases through a multiple column gas chromatographic system according to a preselected timed sequence. A further object is such a valve mechanism which is capable of trouble-free operation at a minimum of expense.

Further objects and a fuller understanding of the invention may be had by referring to the following description and accompanying drawings wherein:

FIGURES 4, 5, 6 and 7 are schematic representations depicting a typical sequence of operation for a three column system.

FIGURE 8 schematically represents a means of sequentially rotating a valve to direct the flow to portions of a multiple column gas chromatography apparatus, and FIGURE 9 diagrammatically illustrates a means of actuating a switching valve to rotate the valve to particular positions according to a preselected timed sequence.

The invention provides a multiple column gas chromatographic system having at least two chromatographic columns, a carrier gas source, sample gas introduction means, sample component detector means positioned downstream of each of the columns, a manifold adapted to connect the columns, the carrier gas source, the sample introduction means and the detectors and a valve mechanism positioned in the manifold adapted to direct the flow of carrier gas and sample gas to portions of the above apparatus according to a preselected timed sequence. The valve mechanism includes a plug-type valve having a valve body provided with at least two combinations each consisting of a first inlet, a first outlet, a second inlet and a second outlet, a tapered plug adapted to fit rotatably in the valve body and to maintain gas-sealing contact therewith. The plug is adapted to rotate to each of four preselected positions and is provided with at least two combinations each consisting of a first flow channel and a second flow channel. The configuration of the flow channels is such that when the plug is rotated to the first position flow communication is established between the first inlet and the first outlet, when rotated to the second position the inlets and outlets are isolated, when rotated to the third position flow communication is established between the second inlet and the first outlet, and when rotated to the fourth position flow communication is established between the first inlet and the second outlet. Also provided is a means adapted for rotating the plug member to the above positions, and an actuator adapted to automatically rotate the plug in accordance with a preselected timed sequence.

Figure 1:
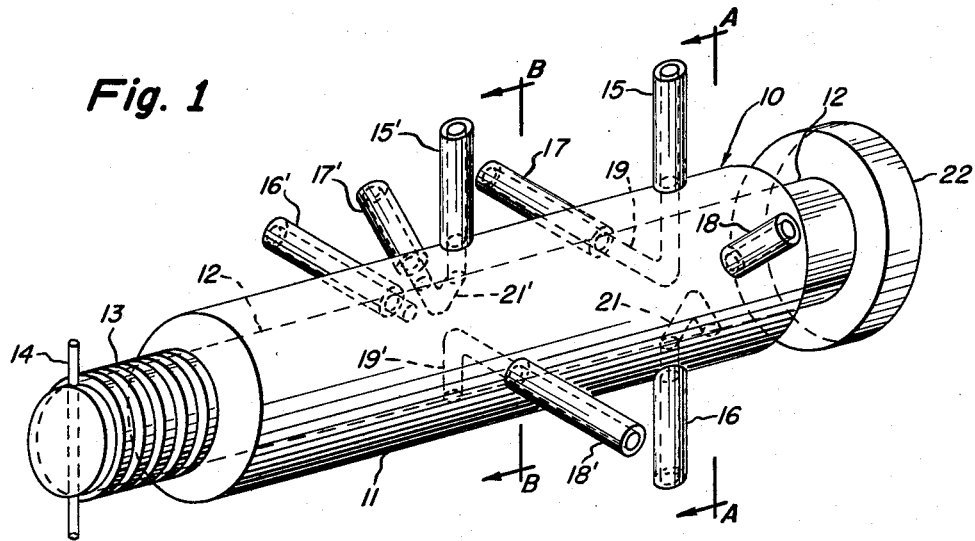
FIGURE 1 illustrates a preferred form of a valve employed in a multiple column gas chromatography system.

Referring to FIGURE 1, preferably, a plug-type valve 10 is employed as a column switching valve. The valve 10 has a valve body 11, preferably constructed of brass or another corrosion resistant metal, and a tapered plug member 12, preferably constructed of a fluorocarbon resin, such as Teflon. The plug member 12 is rotatable in the valve body 11, and is held in gas-sealing contact with the inner wall of the valve body 11 by a spring member 13 and pin member 14. By utilizing a material such as Teflon, which offers a non-adhering surface, a self-lubricating type valve is provided.

The valve body 11 is provided with at least two combinations of inlets 15 and 16, 15' and 16' and outlets 17 and 18, 17' and 18' which may be connected to appropriate columns, detectors or gas sources by means of tubing. The plug member 12 is provided with ports, or flow channels, which establish flow communication with the various inlets and outlets of the valve body when the plug 12 is rotated in the valve body 11. At least two combinations of flow channels 19 and 21, 19' and 21' are provided in the plug member 12, and these are of such a configuration as to either provide registry between appropriate inlets and outlets or to isolate the inlets and outlets when the plug is rotated to the desired position in the valve body. The flow channels preferably are V-shaped holes of cylindrical cross-section bored into the plug, but may be of other suitable shapes or cross-sections. The flow channels 19 and 21, for example, are preferably arranged in substantially the same planes as their respective inlets and outlets to correspond with the inlets 15 and 16 and the outlets 17 and 18. In a system employing a valve as described the order of gas flow to each column will be determined by the configurations of the flow channels.

Figure 2:
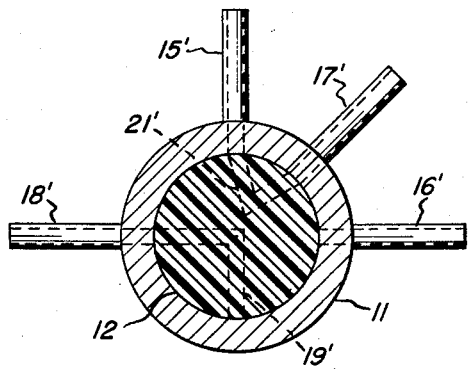
FIGURES 2 and 3 are cross-sectional views of the valve of FIGURE 1, taken at lines B—B and A—A, respectively.
Figure 3:
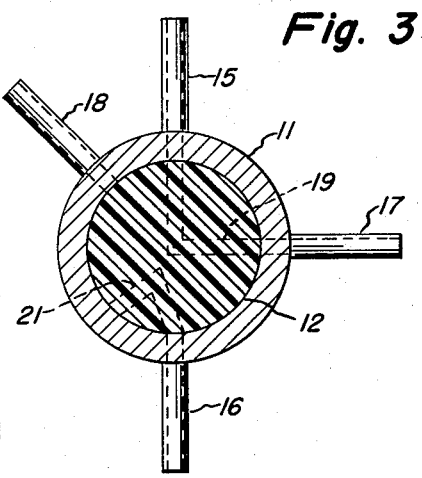

A number of the combinations of the flow channels and inlets and outlets as described above may be spaced axially along the valve in substantially parallel planes, however, in the preferred form a two-section valve is contemplated. FIGURES 2 and 3 are cross-sectional views of the valve of FIGURE 1, taken at lines A—A and B—B, respectively, to show typical configurations of the valve inlets and outlets and the flow channels.

The plug member 12 is provided with a disc 22 preferably mounted on the end of the plug opposite from the spring 13. The disc 22 is adapted to rotate the plug member 12 in the valve body 11 to four positions which correspond with the establishment of flow communications between the various valve inlets and outlets according to a timed sequence selected on the basis of the analysis to be conducted. Referring to FIGURE 8 the rotating disc 22 may be provided with a series of approximately 1/8″ diameter pins 23 inserted into the disc around its periphery. In order to switch from one column in a system to another column the disc 22 is rotated to successively assume positions 24, 25, 26 and 27. It has been found preferable to turn the disc 22 by a pneumatic system as shown in FIGURE 9. To turn the disc a shoe member 28 mounted at one end of a lubricating piston 29 is driven against the pins 23 to rotate the disc 22 to the various positions. The shoe member 28 advantageously has a hinged connection to the piston 29 and is flexibly held in position on the piston by means of a spring member 31 so as not to interfere with the pins 23 on the back-stroke of the piston. The timer 32 opens the solenoid valve 33 which admits air pressure to the cylinder 34 and forces the piston 29 towards the disc 22. The shoe member 28 then engages with a pin 23 and rotates the plug member 12 to the next successive position. At the end of a selected time interval determined by the timer 32 the solenoid valve 33 is closed and the air pressure is released from the cylinder 34, upon which the cylinder spring 36 returns the piston 29 to its initial position. The timer 32 may be set to rotate the plug member 12 to desired positions at various time intervals which are determined by the nature of the particular analyses. While the pneumatic system as described above has been found to be preferable and the power necessary to turn the plug member 12 can be easily regulated by increasing or decreasing the air pressure by adjusting the pressure regulator 37, other methods of turning the plug member, such as a timer and stepping relay or a timer and a small motor properly geared and connected to the plug are considered within the scope of the invention.

FIGURES 4, 5, 6 and 7 illustrate a typical sequence of operation of a three column gas chromatography apparatus employing a valve as described above. In order to simplify the description of the operation of the apparatus, sections of the valve body corresponding to FIGURES 2 and 3 are shown. The operation of the apparatus is best understood by describing a typical sample analysis using gas chromatography apparatus having three chromatographic columns packed with various materials. The first column 38 is packed with safrol on firebrick, the second column 39 contains silica gel and the third column 41 is packed with molecular sieve material. As an example the operation describes the sequence of operation for a routine analysis of dry gases from a catalytic cracking unit. FIGURES 4, 5, 6 and 7 show the four sequences of the valve settings required to direct the flow of carrier gas, in this case helium, through the proper columns. A sample is introduced into the system through a sample valve 42 and the timer 32 is started. During the period of 0 to 5 minutes, the sample is distributed through the three columns. The first column 38 contains $H_2S$ and $C_3+$; the second column 39 retains $CO_2$, $C_2$ and $C_2=$; the third column 41 retains $H_2$, $O_2$, $N_2$, $C_1$ and $CO$. At the end of 5 minutes the switching valve is automatically turned to sequence 2 by the actuating device as shown in FIGURE 5. Helium flows only through the third column 41, elutes the gases from the column and the carrier gas-sample gas stream is passed to a first sample component detector, a thermal conductivity cell 43. At the end of 15 minutes, the valve automatically changes to sequence 3, as shown in FIGURE 6, and the second column 39 is eluted in a similar manner. The carrier gas-sample gas stream then passes to a second thermal conductivity cell 44. At the end of 15 minutes, the valve automatically changes to the next position, as shown in FIGURE 7, so that helium is directed only through the first column 38, and the $H_2S$ and $C_3$ components are eluted and passed with the carrier gas to a third thermal conductivity cell 46. Fifteen minutes later, the valve is returned to the starting position by means of the actuating device and the apparatus is ready for the introduction of another sample.

Table I shows the functions of the various columns during the course of analysis as described above.

*Table I*

| Time | Columns | Action | Components |
|---|---|---|---|
| 0 | | Charging Sample | Gas |
| 5 minutes | 1 | Holding | $C_3+$, $H_2S$ |
| | 2 | do | $C_2$, $CO_2$, and $C_2=$ |
| | 3 | Starting Analysis | $H_2$, $O_2$, $N_2$, $C_2$, and $CO$ |
| 20 minutes | 1 | Holding | $C_3+$, $H_2S$ |
| | 2 | Starting Analysis | $C_2$, $CO_2$, and $C_2=$ |
| | 3 | Empty | |
| 35 minutes | 1 | Starting Analysis | $C_3+$, $H_2S$ |
| | 2 | Empty | |
| | 3 | do | |
| 50 minutes | 1 | do | |
| | 2 | do | |
| Run finished | 3 | do | |

Valve returned manually to starting position for next run.

The apparatus as described above when used with an automatic range changer on a recorded (not shown) to compensate for differences in the concentration of the various components, allows a gas analysis to be made without operator attention after he has introduced the sample into the system. The proper time cycle must be established for each multiple column setup with consideration given to the length of the column, type of packing and other factors.

Having described my invention, what I claim is:

Apparatus for directing the flow of carrier gas and sample gas in a multiple-column gas chromatographic system according to a preselected timed sequence which apparatus comprises a plug-type valve having a valve body provided with a first carrier gas inlet, a first carrier gas-sample gas inlet, a first carrier gas-sample gas outlet and a first detector outlet all arranged peripherally around said valve body in a first plane, a second carrier gas inlet, a second carrier gas-sample gas inlet, a second carrier gas-sample gas outlet and a second detector outlet all arranged peripherally around said valve body in a second plane substantially parallel with said first plane, a tapered plug member adapted to fit rotatably in said valve body and to maintain gas-sealing contact therewith, said plug member being adapted to rotate to each of four preselected positions and provided with a first pair of V-shaped flow channels in a plane in substantial alignment with said first plane and a second pair of flow channels in a plane substantially aligned with said second plane, the configuration of said flow channels being such that when said plug member is rotated to a first position flow communication is established between said first carrier gas-sample gas inlet and said first carrier gas-sample gas outlet and between said second carrier gas-sample gas inlet and said second carrier gas-sample gas outlet, when rotated to a second position said first carrier gas sample gas inlet and said first carrier gas-sample gas outlet are isolated and flow communication is established between said second carrier gas inlet and said second carrier gas-sample gas outlet, when rotated to a third position flow communication is established between said first carrier gas inlet and said first carrier gas-sample gas outlet and between said second carrier gas-sample gas inlet and said second detector outlet and when rotated to a fourth position flow communication is established between said first carrier gas-sample gas inlet and said first detector outlet while said second inlets and outlets are isolated, a disc mounted on said plug member adapted to rotate said plug member, said disc being provided with three pins positioned adjacent the periphery of said disc, an actuator means comprising essentially a shoe member adapted to engage with said pins to rotate said plug member, a fluid-operated reciprocating piston adapted to drive said shoe against said pins whereby said plug member is rotated, flow-regulating means to control the flow of said fluid to said piston and timer means operably connected with said flow-regulating means to operate said piston at preselected timed intervals.

References Cited in the file of this patent

UNITED STATES PATENTS

| | | |
|---|---|---|
| 943,060 | Bienz | Dec. 14, 1909 |
| 1,223,038 | Crovo | Apr. 17, 1917 |
| 2,309,137 | Peterkin | Jan. 26, 1943 |
| 2,830,738 | Sorg et al. | Apr. 15, 1958 |
| 2,833,151 | Harvey | May 6, 1958 |
| 2,853,102 | Walker | Sept. 23, 1958 |
| 2,972,246 | Reinecke et al. | Feb. 21, 1961 |

OTHER REFERENCES

Lehrer et al.: German application 1,065,639, Sept. 17, 1959.

Article entitled "Analysis of Fixed and Condensable Gases by Two-Stage Gas Chromatography," November 1958, pages 1859 to 1862, by J. J. Madison, Analytical Chemistry, vol. 30, No. 11.